United States Patent
Matsuura (10) Patent No.: US 8,421,817 B2
(45) Date of Patent: Apr. 16, 2013

(54) COLOR PROCESSING APPARATUS AND METHOD THEREOF

(75) Inventor: Takahiro Matsuura, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 751 days.

(21) Appl. No.: 12/207,059

(22) Filed: Sep. 9, 2008

(65) Prior Publication Data

US 2009/0079756 A1  Mar. 26, 2009

(30) Foreign Application Priority Data

Sep. 26, 2007  (JP) ................. 2007-250065

(51) Int. Cl.
*G09G 5/02* (2006.01)
*G06K 9/00* (2006.01)

(52) U.S. Cl.
USPC .......................... 345/594; 382/162

(58) Field of Classification Search ................ 345/594; 382/162
See application file for complete search history.

(56) References Cited

U.S. PATENT DOCUMENTS

| 7,680,342 | B2 * | 3/2010 | Steinberg et al. ............. 382/224 |
| 2005/0063585 | A1 * | 3/2005 | Matsuura ...................... 382/162 |
| 2005/0235207 | A1 * | 10/2005 | Albrecht et al. .............. 715/705 |

FOREIGN PATENT DOCUMENTS

| JP | 2004-236200 A | 8/2004 |
| JP | 2004-341923 | 12/2004 |
| JP | 2005-012659 A | 1/2005 |
| JP | 2007-013831 A | 1/2007 |
| JP | 2007-067558 A | 3/2007 |

OTHER PUBLICATIONS

The above references were cited in a Sep. 22, 2011 Japanese Office Action, which is enclosed without an English Translation, that issued in Japanese Patent Application No. 2007-250065.

* cited by examiner

*Primary Examiner* — Said Broome
*Assistant Examiner* — Peter Hoang
(74) *Attorney, Agent, or Firm* — Cowan, Liebowitz & Latman, P.C.

(57) ABSTRACT

In order to obtain a highly accurate color processing condition, a user is allowed to easily adjust a weight for a patch image with poor reliability. Hence, a color processing apparatus inputs color data of a plurality of patches included in a color chart captured by an image sensing device. Patch images based on the color data are displayed on a monitor, and a user interface for inputting a user's instruction to adjust a weight value for each patch image is displayed on a monitor. A color processing condition of an image captured by the image sensing device is generated based on the weight value, the color data, and a target value of a color representation corresponding to each patch image.

8 Claims, 6 Drawing Sheets

| SKIN 1 | SKIN 2 | SKY 1 | GRASS | BLUISH PURPLE | SKY 2 |
|---|---|---|---|---|---|
| ORANGE | DEEP BLUE | DEEP PINK | PURPLE | YELLOWISH GREEN | YELLOWISH ORANGE |
| BLUE | GREEN | RED | YELLOW | MAGENTA | CYAN |
| WHITE | GRAY 1 | GRAY 2 | GRAY 3 | GRAY 4 | BLACK |

COLOR PROCESSING APPARATUS AND METHOD THEREOF

BACKGROUND OF THE INVENTION

1. Field of the Invention

The present invention relates to color processing of a captured image.

2. Description of the Related Art

An image sensing device such as a digital camera internally holds a plurality of profiles for color processing in advance and performs color processing of captured image data by selectively using a profile according to a selected image capturing mode. In other words, a user can set only those profiles (color processing conditions) provided in advance, and therefore user's preferred color representation is sometimes not realized.

In these days, users of digital cameras want to generate an optimal color processing condition in a given image capturing environment.

The present inventor has proposed a method of editing a color processing condition that allows a user to freely set the color representation of a digital camera according to user's preference (see Japanese Patent Laid-Open No. 2004-341923). According to this editing method, a color chart including skin color, the color of the sky, the color of grass, garish colors, and the like is captured by a digital camera in a given image capturing environment. Then, a color processing condition can be obtained that brings the captured image data closer to the original colors of the color chart or to colors (to be referred to as target colors, hereinafter) that are preferable for a user, for example, skin color, the color of the sky, the color of grass, garnish colors, or the like.

It is difficult to appropriately capture a color chart in a given image capturing environment. For example, when capturing a color chart outdoors, the color chart may not be uniformly illuminated because of the influence of a shadow or the like. Also, indoors, an illumination such as a fluorescent light may reflect on the color chart.

In a color chart, the patch image of a shadow portion and a patch image reflecting an illumination are poor in reliability as a patch image for generating a color processing condition. A color processing condition generated from a patch image with poor reliability contains a large error.

A method of editing a color processing condition described in Japanese Patent Laid-Open No. 2004-341923 can automatically change the weight according to whether the color value of each patch of a color chart falls inside or outside the target color gamut (e.g., an sRGB, AdobeRGB, or the like) upon generating a color processing condition. However, this editing method does not consider the reliability of a patch image that depends on the condition upon image capturing. In addition, with this editing method, a user cannot interactively change the weight with respect to a given color patch.

SUMMARY OF THE INVENTION

In one aspect, a color processing apparatus comprises: an inputting section, arranged to input color data of a plurality of patches included in a color chart captured by an image sensing device; a display controller, arranged to display patch images based on the color data on a monitor and to display on the monitor a user interface for inputting a user's instruction to adjust a weight value for each of the patch images; and a generator, arranged to generate a color processing condition of an image captured by the image sensing device, based on the weight value, the color data, and a target value of a color representation corresponding to each of the patch images.

According to the aspect, it is possible for a user to easily adjust a weight for a patch image with poor reliability in order to obtain a highly accurate color processing condition.

Further features of the present invention will become apparent from the following description of exemplary embodiments (with reference to the attached drawings).

DESCRIPTION OF THE EMBODIMENTS

Color processing of an embodiment according to the present invention will now be described in detail with reference to the accompanying drawings.

First Embodiment

[Arrangement of Apparatus]

Figure 1:
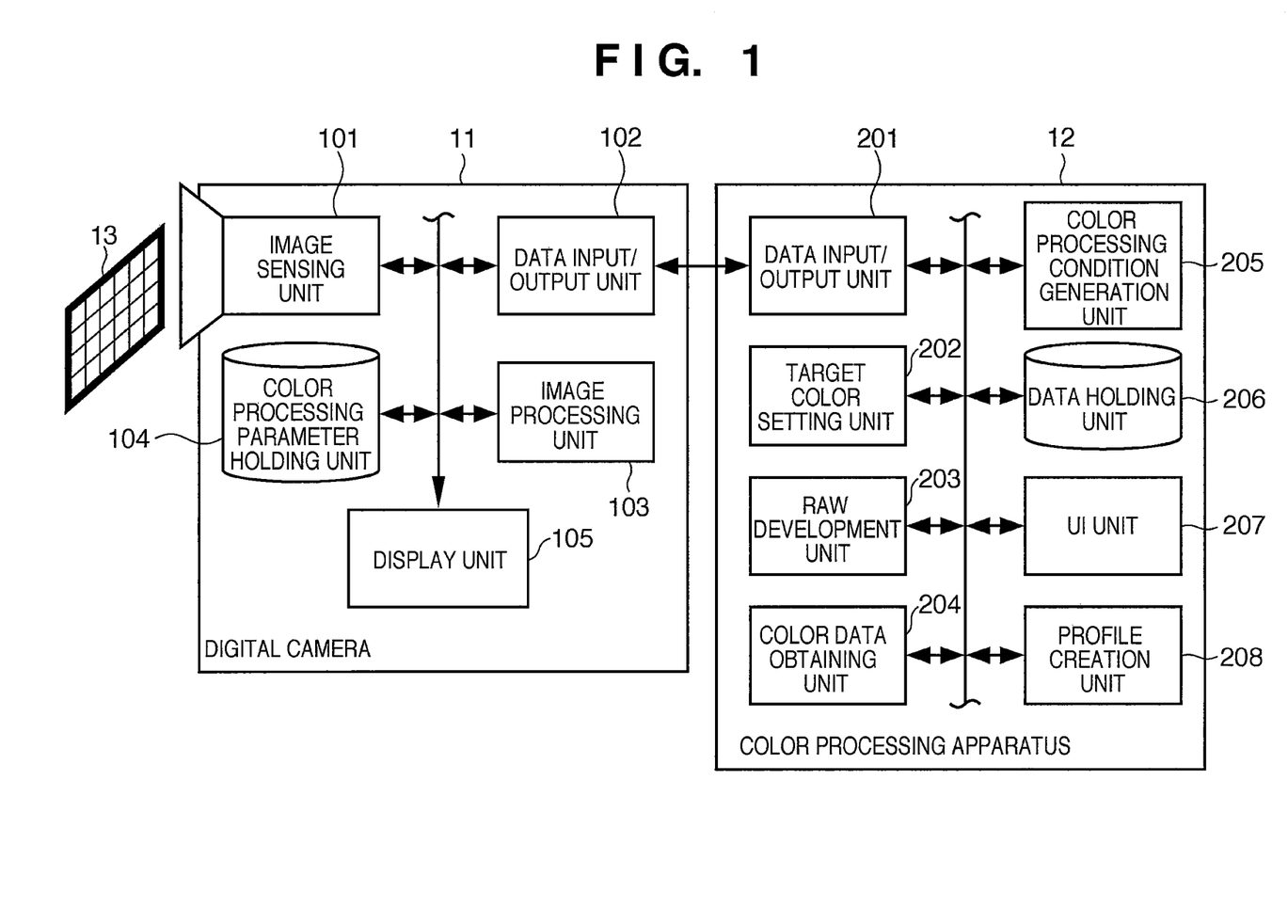
FIG. 1 is a block diagram showing the configuration of a color processing system.

FIG. 1 is a block diagram showing the configuration of a color processing system of the first embodiment.

The color processing system includes a digital camera 11 which captures a color chart 13 and a color processing apparatus 12 which edits color processing parameters.

In the digital camera 11, an image sensing unit 101 has an iris, an image capturing lens, and an image sensor such as a charge-coupled device (CCD) or a CMOS image sensor.

A data input/output unit 102 is an interface with an external apparatus (in this embodiment, the color processing apparatus 12) for outputting image data and inputting a profile for color processing. As the data input/output unit 102, a serial bus interface such as a USB (Universal Serial Bus) or IEEE1394 or a wireless network interface can be utilized. Alternatively, a memory card reader/writer may be used as the data input/output unit 102 to input/output data via a memory card.

An image processing unit 103 applies, image processing including color processing using a profile for color processing held by a color processing parameter holding unit 104, to image data (RAW data) captured by the image sensing unit 101 so as to generate, for example, JPEG image data. An image represented by the generated image data is displayed on a display unit 105 such as a liquid crystal display (LCD).

In the color processing apparatus 12, a data input/output unit 201 is an interface with an external apparatus (in this embodiment, the digital camera 11) for inputting image data and outputting a profile for color processing. The data input/output unit 201 also inputs the calorimetric values (target values) of a color chart (to be described later) from a calorimeter (not shown) or the like. As the data input/output unit 201, a serial bus interface such as a USB or IEEE1394 or a wireless network interface can be utilized. Alternatively, a memory card reader/writer may be used as the data input/output unit 201 to input/output data via a memory card.

A target color setting unit 202 uses a UI unit 207 (to be described later) to set a target color of an image captured by the digital camera 11.

A RAW development unit 203 performs demosicing (RAW development) on RAW data captured by the image sensing unit 101 of the digital camera 11 and input by the data input/output unit 201 by using a development parameter (RAW development parameter) held by a data holding unit 206. The demosicing is a process for converting an image obtained by a sensor into an image which looks natural to human eyes. An RAW development parameter is used for color processing in this process. A RAW development parameter includes, for example, white balance data set based on a light source used upon capturing.

A color data obtaining unit 204 calculates an RGB average value of each patch of the color chart 13 expressed by the image data demosaiced by the RAW development unit 203. A color processing condition generation unit 205 uses, for example, a DLS (dumped least square) method or the like to optimize a color processing parameter and generates a color processing condition. A profile creation unit 208 creates a profile using the color processing condition generated by the color processing condition generation unit 205.

The data holding unit 206 stores various types of data in addition to development parameters. The user interface (UI) unit 207 is used by a user to input an instruction or data to the color processing apparatus 12, and includes a display unit, a display control unit which causes the display unit to display a UI thereon, and a keyboard, pointing device, touch panel, or the like.

[Color Chart 13]

Figure 2:
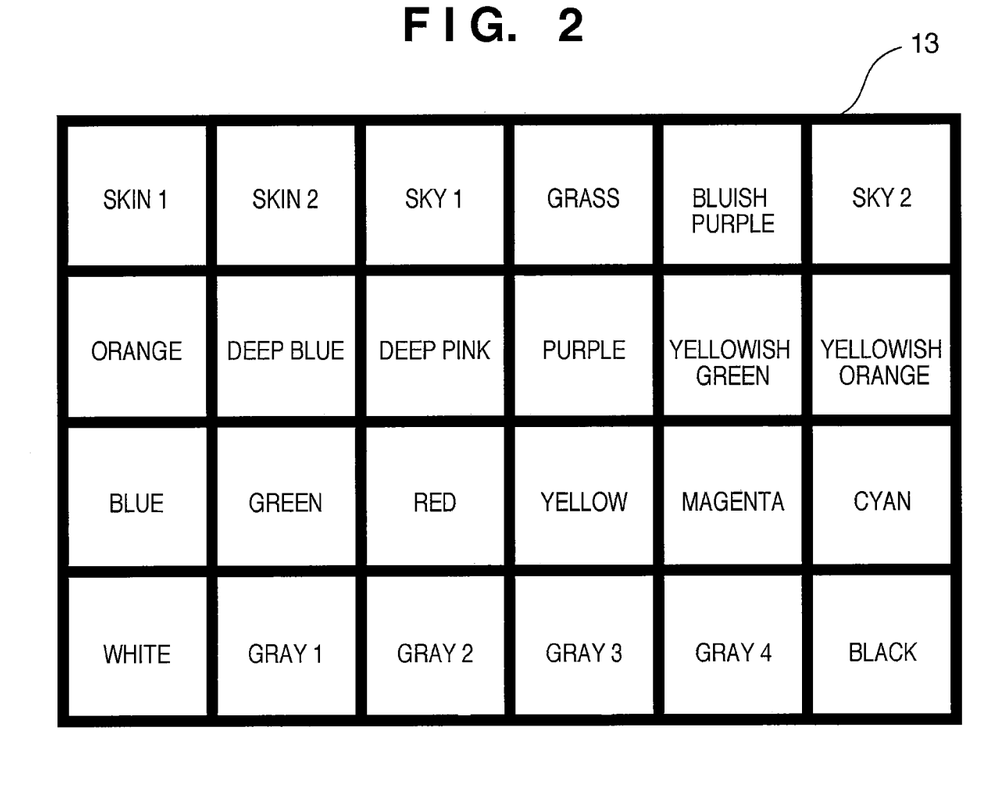
FIG. 2 is a view showing an example of a color chart.

FIG. 2 is a view showing an example of the color chart 13. As the color chart 13, it is preferable to use a color chart for color design, for example, ColorChecker for DC (240 colors), ColorChecker (24 colors), or the like available from Gretag-Macbeth AG.

[Processing of Digital Camera]

A user manipulates the digital camera 11 to display an image to be captured (obtained) by the image sensing unit 101 on the display unit 105. The user views the displayed image on the display unit 105, decides on the composition, and presses a shutter button (not shown) to capture an object.

When the shutter button is pressed, the image processing unit 103 applies image processing to the RAW data captured by the image sensing unit 101 to generate image data. At this time, the color or luminance of the image is adjusted.

[Processing of Color Processing Apparatus]

Figure 3:
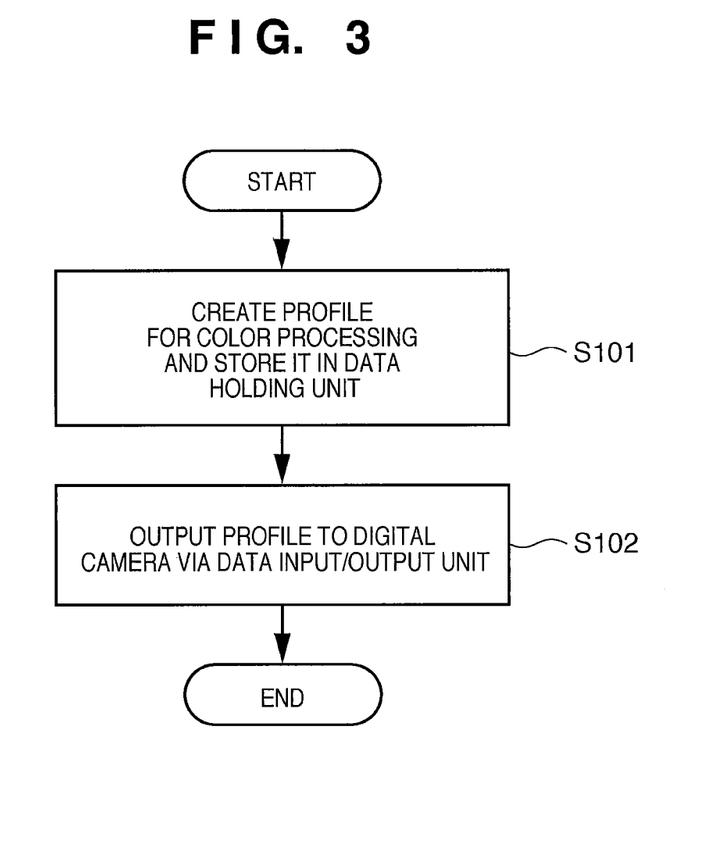
FIG. 3 is a flowchart illustrating an example of a profile creation process.

FIG. 3 is a flowchart illustrating an example of a profile creation process, which is executed by the color processing apparatus 12 when the creation of a profile is instructed via the UI unit 207.

The color processing apparatus 12 creates a profile for color processing and stores it in the data holding unit 206 (S101) This step will be described later in detail. The color processing apparatus 12 outputs (uploads) the profile stored in the data holding unit 206 to the digital camera 11 via the data input/output unit 201 (S102).

•Creation of Profile

Figure 4:
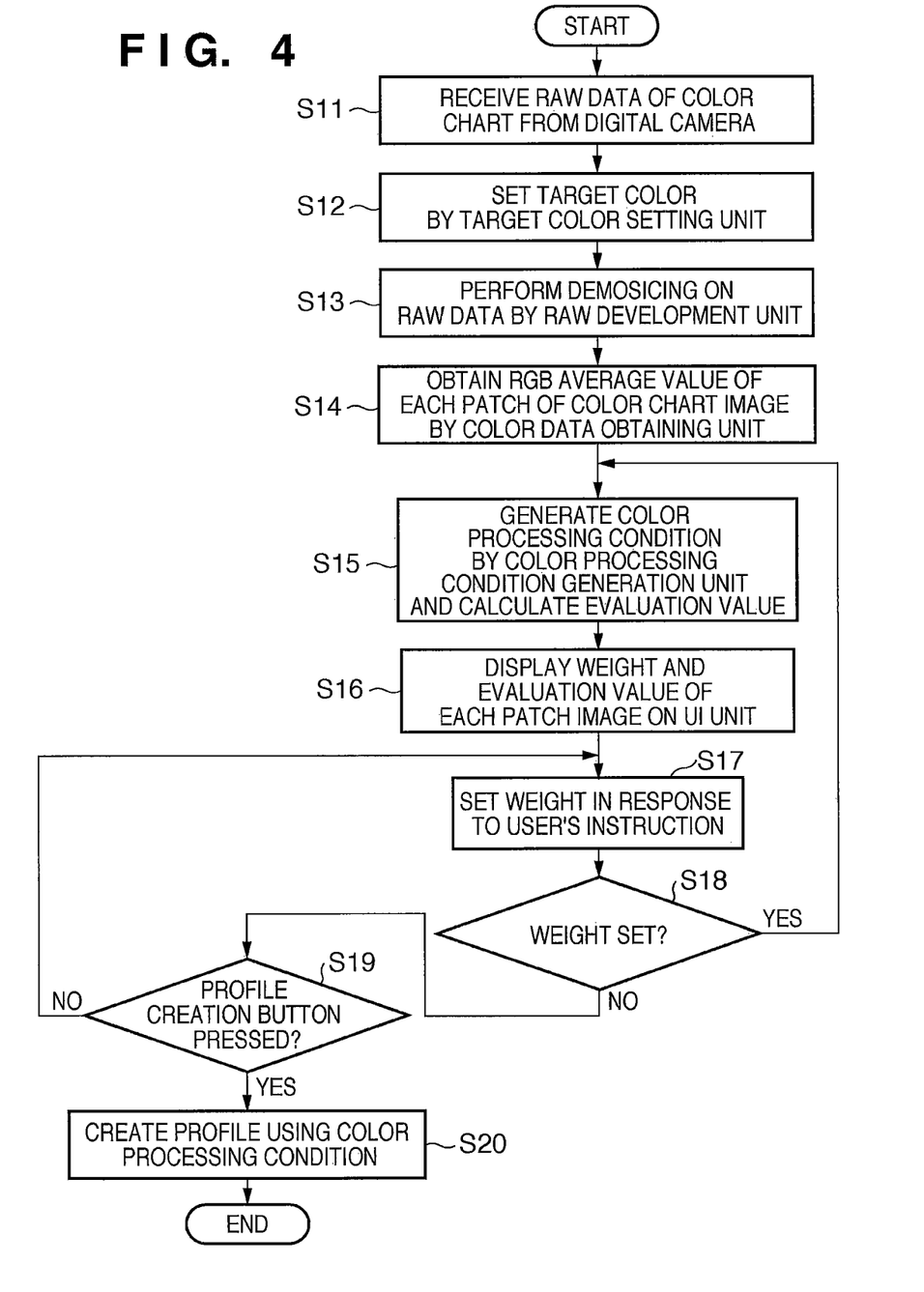
FIG. 4 is a flowchart illustrating details of profile creation.

FIG. 4 is a flowchart illustrating details of the creation of a profile (S101).

The color processing apparatus 12 receives the RAW data of the color chart 13 from the digital camera 11 via the data input/output unit 201 (S11). At this time, the color processing apparatus 12 may manipulate the digital camera 11 to output the RAW data, or the user may manipulate the digital camera 11 to output the RAW data.

Next, the color processing apparatus 12 causes the target color setting unit 202 to set a target color (S12). A target color is a calorimetric value corresponding to each patch of the color chart 13. The user inputs the calorimetric value (e.g., the XYZ value) of a target color to be set by inputting a numerical value or selecting a target value set stored in the data holding unit 206 via the UI unit 207.

The color processing apparatus 12 then causes the RAW development unit 203 to demosaic the RAW data to generate color chart image data (S13). The color data obtaining unit 204 obtains the RGB average value of each patch of the color chart image from the color chart image data (S14). The color processing condition generation unit 205 generates a color processing condition using a default weight value wi and calculates an evaluation value Ei of each patch image (S15). The default weight value wi is 1. However, the luminance histogram of each patch image may be created when the color data obtaining unit 204 calculates the RGB average value. In this case, a patch image whose variance of the luminance values is equal to or larger than a predetermined value may be determined to be reflecting an illumination or the like, and the default value of the weight value wi may be set to 0 or a small value.

Figure 5:
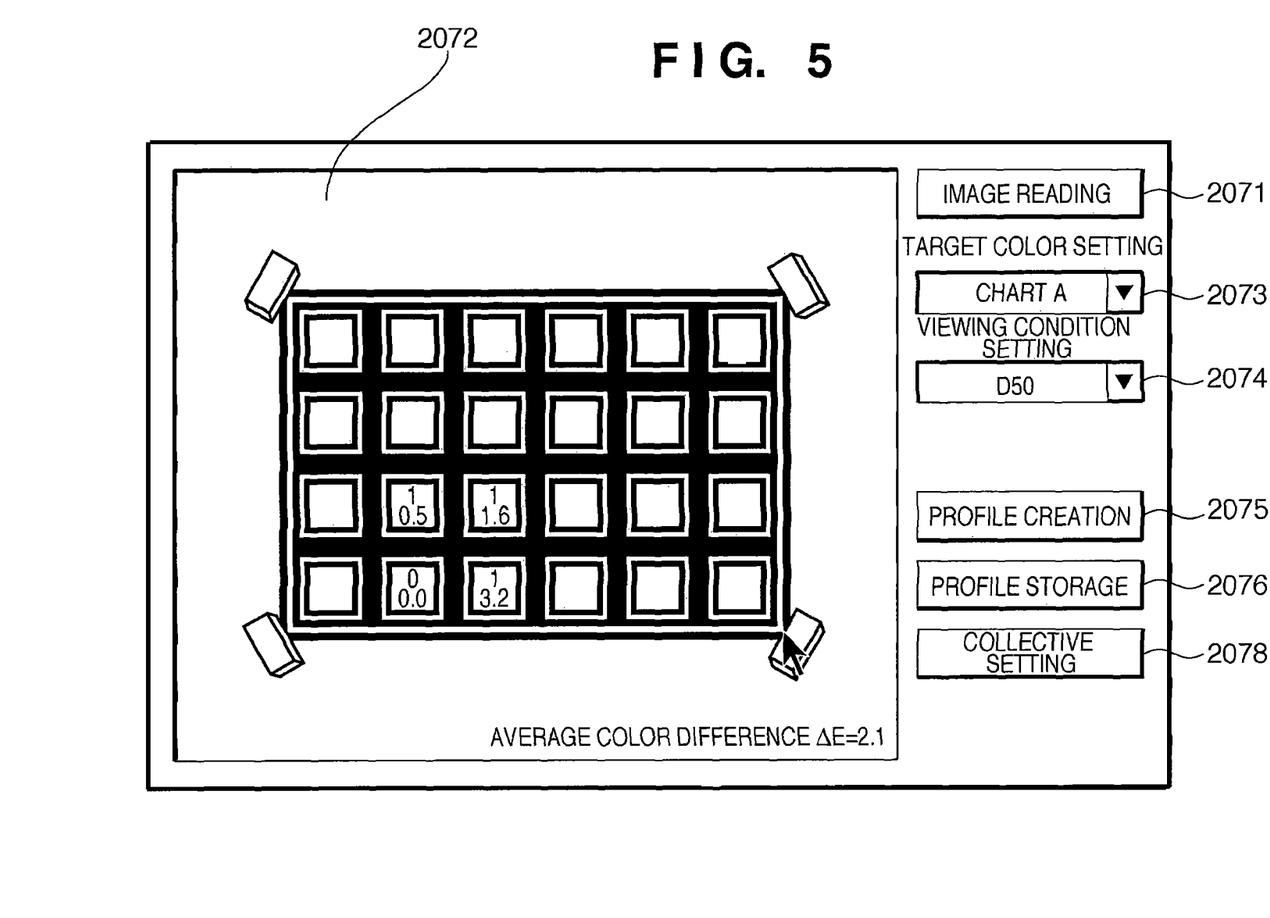
FIG. 5 is a view showing an example of a UI displayed on a UI unit when creating a profile.

FIG. 5 is a view showing an example of a user interface (UI) displayed on the UI unit 207 by the color processing apparatus 12 when creating a profile.

The color processing apparatus 12 displays the demosaiced color chart image on an image display section 2072 as well as the weight value wi and evaluation value Ei for each patch, and displays the average value (average color difference ΔE) of the evaluation values Ei (S16). The image display section 2072 is a display region in the user interface used to display a color chart image. In this embodiment, a patch is selected by pointing the patch displayed on the display region by a pointing device. Note that FIG. 5 shows a case in which the weight value wi is displayed in the upper portion of the patch image and the evaluation value Ei is displayed in the lower portion.

The color processing apparatus 12 sets a weight value according to a user's instruction (S17). The user uses the pointing device or the like to select a patch image displayed on the image display section 2072, and inputs the weight value wi ($0 \leq wi \leq 1$) for the selected patch image by using a keyboard or the like (individual setting). When the weight value wi for a patch image with poor reliability is set to a small value or 0, the influence of that patch image upon the generation of a color processing condition can be reduced or eliminated.

The patch image of a shadow portion and a patch image reflecting an illumination can be easily extracted by checking the displayed color chart image. The UI unit 207 allows the user to adjust the weight value for each patch while checking the color chart image. Accordingly, the user can easily adjust the weight value for a patch image with poor reliability.

In addition, in this embodiment, the average value and maximum value of the evaluation values (color differences) are displayed as indices used when the user adjusts the weight value.

Figure 6:
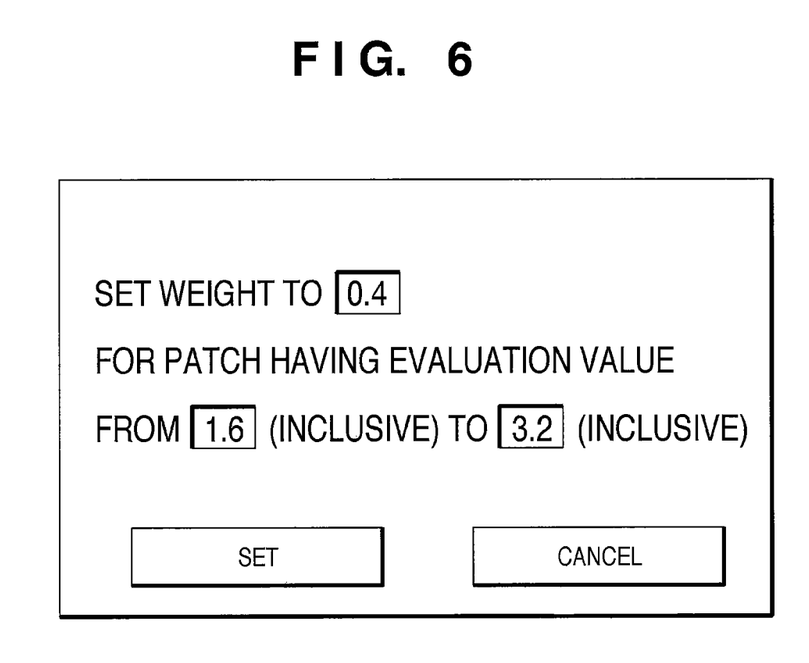
FIG. 6 is a view showing an example of a dialog for collectively setting weight values.

Furthermore, in this embodiment, it is also possible to collectively adjust the weight values for a plurality of patch images. When a collective setting button 2078 is pressed, a diagram illustrated in FIG. 6 is displayed. The weight values wi for the patch images having the evaluation values Ei falling in the range of the evaluation value Ei designated by the user are uniformly set to the value designated by the user (collective setting).

The color processing apparatus 12 determines whether a weight value is set (S18). When YES in step S18, the color processing apparatus 12 returns the process to step S15, regenerates a color processing condition, and recalculates the evaluation value Ei of the patch image whose weight value is set. The color processing apparatus 12 determines whether a profile creation button 2075 is pressed (S19). When YES in step S19, the color processing apparatus 12 accepts the color processing condition and creates a profile (S20).

•Color Processing Condition Generation Unit

A color processing condition is represented by, for example, a 3×3, 3×9, or 3×19 matrix or the like. More specifically, matrix coefficients that decrease the color differences between the input data (the RGB average value of each patch) and the target colors are calculated by using an optimization method such as DLS.

Assume that the RGB value of the image data after the RAW development is a value in an sRGB space specified by IEC 61966-2-1. Let the value obtained by applying a matrix operation to the RGB average value of each patch be RiGiBi. Note that when the patch count is N, i is 1 to N. Also, let the value obtained by converting RiGiBi into CIELAB be Liaibi.

The color processing condition generation unit 205 normalizes the input data (the RGB average value RaiGaiBai of each patch). That is, when the input data is expressed by 10 bits per color, each value is divided by 1023 ($=2^{10}-1$). Using one of equations (1) to (3), that is, using an equation corresponding to the matrix operation to be used, the RiGiBi value is calculated.

$$\begin{bmatrix} Ri \\ Gi \\ Bi \end{bmatrix} = M1 \begin{bmatrix} Rai \\ Gai \\ Bai \end{bmatrix} \quad (1)$$

where M1 is a 3×3 matrix.

$$\begin{bmatrix} Ri \\ Gi \\ Bi \end{bmatrix} = M2 \begin{bmatrix} Rai \\ Gai \\ Bai \\ Rai \cdot Rai \\ Rai \cdot Gai \\ Rai \cdot Bai \\ Gai \cdot Gai \\ Gai \cdot Bai \\ Bai \cdot Bai \end{bmatrix} \quad (2)$$

where M2 is a 3×9 matrix.

$$\begin{bmatrix} Ri \\ Gi \\ Bi \end{bmatrix} = M3 \begin{bmatrix} Rai \\ Gai \\ Bai \\ Rai \cdot Rai \\ Rai \cdot Gai \\ Rai \cdot Bai \\ Gai \cdot Gai \\ Gai \cdot Bai \\ Bai \cdot Bai \\ Rai \cdot Rai \cdot Rai \\ Rai \cdot Rai \cdot Gai \\ Rai \cdot Rai \cdot Bai \\ Rai \cdot Gai \cdot Gai \\ Rai \cdot Gai \cdot Bai \\ Rai \cdot Bai \cdot Bai \\ Gai \cdot Gai \cdot Gai \\ Gai \cdot Gai \cdot Bai \\ Gai \cdot Bai \cdot Bai \\ Bai \cdot Bai \cdot Bai \end{bmatrix} \quad (3)$$

where M3 is a 3×19 matrix.

The color processing condition generation unit 205 converts the RiGiBi value into an XYZ value by:

$Rli = Ri/12.92$ when $Ri \leq 0.04045$ $Rli = \{(Ri+0.055)/1.055\}^{2.4}$ when $Ri > 0.04045$ $Gli = Gi/12.92$ when $Gi \leq 0.04045$ $Gli = \{(Gi+0.055)/1.055\}^{2.4}$ when $Gi > 0.04045$ $Bli = Bi/12.92$ when $Bi \leq 0.04045$ $Bli = \{(Bi+0.055)/1.055\}^{2.4}$ when $Bi > 0.04045$ \quad (4)

$$\begin{bmatrix} Xi \\ Yi \\ Zi \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} Rli \\ Gli \\ Bli \end{bmatrix} \quad (5)$$

The color processing condition generation unit 205 then converts the XiYiZi value into an Lab value by:

$Xi_{Rate} = (Xi/Xn)^{1/3}$ when $Xi/Xn > 0.00856$ $Xi_{Rate} = 7.787 \cdot (Xi/Xn) + 16.0/116.0$ when $Xi/Xn \leq 0.00856$ $Yi_{Rate} = (Yi/Yn)^{1/3}$ when $Yi/Yn > 0.00856$ $Yi_{Rate} = 7.787 \cdot (Yi/Yn) + 16.0/116.0$ when $Yi/Yn \leq 0.00856$ $Zi_{Rate} = (Zi/Zn)^{1/3}$ when $Zi/Zn > 0.00856$ $Zi_{Rate} = 7.787 \cdot (Zi/Zn) + 16.0/116.0$ when $Zi/Zn \leq 0.00856$ \quad (6)

where
   Xn=95.045
   Yn=100.000
   Zn=108.892

$Li = 116.0 \cdot (Yi/Yn)1/3 - 16.0$ when $Yi/Yn > 0.00856$ $Li = 903.29 \cdot (Yi/Yn)$ when $Yi/Yn \leq 0.00856$ $$ai = 500 \cdot (Xi\text{Rate} - Yi\text{Rate})$$

$$bi = 200 \cdot (Yi\text{Rate} - Zi\text{Rate}) \quad (7)$$

The color processing condition generation unit 205 calculates a sum E of the evaluation values Ei corresponding to the respective patches to calculate matrix coefficients that minimize the sum E of the evaluation values Ei, by:

$$E = \sum wi \cdot Ei \quad (8)$$
$$= \sum wi\sqrt{\{(Lti - Li)2 + (ati - ai)2 + (bti - bi)2\}}$$

where $L_t i$, $a_t i$, and $b_t i$ represent the Lab value obtained by converting the XYZ value of the target color; and the range of the $\Sigma$ operation is i=1 to N.

• Profile

A profile for color processing is, for example, a 3DLUT. Assuming that RAW data from the digital camera is expressed by 10 bits per color, and the number of slices of the 3DLUT is 17, a profile is created as follows.

(R,G,B)=(0,0,0), (0,0,64), (0,0,128), ... , (0,0,1023),
(0,64,0), (0,64,64), ... , (0,64,1023), (0,128,0),
(0,128,64), ... , (1023,1023,1023)

The above RGB values of $17^{13} = 4913$ grid points are sequentially input. RGB values are calculated by using the color processing condition calculated previously, and then converted into Lab values while assuming the RGB values to be in the sRGB space. The 4913 combinations of the RGB values and Lab values of the grid points are stored in the data holding unit 206 as a 3DLUT.

[User Interface]

The user presses an image reading button 2071 of the UI illustrated in FIG. 5 to give the instruction to read the RAW data. The color processing apparatus 12 receives the RAW data of a color chart in response to this instruction (S11). The color processing apparatus 12 demosaics the RAW data using the RAW development parameter, and displays a color chart image on the image display section 2072. The user manipulates a target color setting box 2073 to select a color chart corresponding to the color chart image displayed on the image display section 2072. According to this selection, the color processing apparatus 12 sets a target color (S12).

The user can manipulate a viewing condition setting box 2074 to set the viewing condition of the environment in which the user views the image. When a viewing condition (e.g., D65 or D93) other than a standard viewing condition (e.g., D50) is set, the color processing apparatus 12 converts the target color to fit the viewing condition by using the Bradford conversion formula expressed by:

$$\begin{bmatrix} P2x \\ P2y \\ P2z \end{bmatrix} = M4 \begin{bmatrix} Xsrc \\ Ysrc \\ Zsrc \end{bmatrix} \quad (9)$$

$$\begin{bmatrix} P3x \\ P3y \\ P3z \end{bmatrix} = M4 \begin{bmatrix} Xdst \\ Ydst \\ Zdst \end{bmatrix} \quad (10)$$

where $$M4 = \begin{bmatrix} 0.8951 & 0.2664 & -0.1614 \\ -0.7502 & 1.7135 & 0.0367 \\ 0.0389 & -0.0685 & 1.0296 \end{bmatrix}$$

$$\begin{bmatrix} Xout \\ Yout \\ Zout \end{bmatrix} = M4^{-1} \cdot M5 \cdot M4 \begin{bmatrix} Xin \\ Yin \\ Zin \end{bmatrix} \quad (11)$$

where $$M5 = \begin{bmatrix} P3x/P2x & 0 & 0 \\ 0 & P3y/P2y & 0 \\ 0 & 0 & P3z/P2z \end{bmatrix}$$

where Xsrc, Ysrc, and Zsrc represent the XYZ value of a standard color in a standard viewing condition (e.g., D50), Xdst, Ydst, and Zdst represent the XYZ value of a standard color in the designated viewing condition, Xin, Yin, and Zin represent the XYZ value of the target color before conversion, and Xout, Yout, Zout represent the XYZ value of the target color after conversion.

Once the type of a color chart is determined, the number of patches is also determined. All patches may be processed, or some patches may be processed. When some patches are processed, the user sets the weight value wi for the patch not to be processed to 0. Alternatively, the user selects a patch to be processed by clicking the patch displayed on the image display section 2072 by the pointing device. At this time, for example, the selected patch is displayed with the weight value wi and evaluation value Ei, and the unselected patch is displayed without the weight value wi and evaluation value Ei, as shown in FIG. 5.

When the above-described setting and selection are complete, the user presses a profile creation button 2075 to instruct to create a profile. When the instruction for the creation of a profile is given, the color processing apparatus 12 generates a color processing condition and displays a window illustrated in FIG. 5 (S16). Using this window, the user adjusts the weight value wi while checking the displayed color chart image, if necessary (S17). At this time, the weight value wi for a patch image with poor reliability such as a patch image reflecting an illumination is set to a small value or 0 so as to reduce or eliminate the influence of that patch image upon the generation of a color processing condition. In this manner, when the weight for a patch image with poor reliability is appropriately controlled, it is possible to generate a highly accurate color processing condition.

When the user presses the profile creation button 2075, the color processing apparatus 12 creates a profile (S19) and transmits the created profile to the digital camera 11 (S102).

When the user wants to store the created profile in the data holding unit 206, he or she presses a profile storage button 2076. When the color processing apparatus 12 is instructed to store the profile, it stores the created profile in the data holding unit 206. At this time, the color processing apparatus 12 attaches a name automatically generated from the date and time or a name input by the user to the profile, and adds the creation condition (the name of the color chart, viewing condition, patch to be processed, type and serial number of the digital camera) to the profile.

Note that the profile stored in the data holding unit 206 can be output to an external equipment including the digital camera 11 via the data input/output unit 201, as needed. An external equipment also includes a server on a network or a storage medium such as a memory card.

According to this embodiment, it is possible to adjust a weight value for a patch image while checking a displayed color chart image by using the UI illustrated in FIG. 5. Accordingly, it is possible to easily adjust the weight for a patch image with poor reliability.

Since it is possible to adjust the weight for a patch image with poor reliability, capturing a color chart under a given environment need not be done perfectly. That is, it is possible to reduce the load of capturing a color chart.

Generally, a color processing apparatus that creates a profile is separated from a digital camera. Accordingly, a profile is not created on the spot where a color chart is captured, but it is created later by using the image data of the captured color chart. Therefore, even if a defect upon capturing the color chart is found when creating a profile; it may not be possible to recapture the color chart. This is unique to the creation of a profile of an image sensing device in which a color chart capturing condition is important. This embodiment can cope with defects upon capturing a color chart to a certain extent.

[Capture by Digital Camera]

After the profile created by the color processing apparatus 12 is uploaded to the digital camera 11, the user captures an object using a digital camera 11.

Modification of Embodiment

In the above-described embodiment, a 3DLUT is created as a profile. However, a matrix obtained by the color processing condition generation unit 205 may be directly stored as a profile.

In the above-described user interface illustrated in FIG. 5, a patch whose weight value is to be changed is designated by selecting the displayed patch image by a pointing device. However, a patch may be selected by designating a number indicating the patch image. As long as the weight value of a patch can be controlled while displaying a captured color chart image, a method of selecting a patch and that of setting a weight value may be different from those described above.

In the above description, the diagram illustrated in FIG. 6 is used to collectively set the weight values wi for patch images having the evaluation values Ei in the designated range. However, different colors may be set for the RGB average value calculation frames according to the range of the evaluation values, and a weight value may be set for each color.

In the above description, the sum E of the evaluation values Ei calculated by equation (8) is utilized. However, $\Delta E94$ may be used instead. In this case, the equation is:

$$\Delta E94 = \Sigma \Delta E94i = \Sigma \sqrt{[\Delta L^2 + \{\Delta C/(1+0.045C1)\}^2 + \{\Delta H/(1+0.015C1)\}^2]} \quad (12)$$

$$\Delta E94 = \Sigma \Delta wi \cdot E94i = \Sigma wi \sqrt{[\Delta L^2 + \{\Delta C/(1+0.045C1)\}^2 + \{\Delta H/(1+0.015C1)\}^2]} \quad (13)$$

where
$\Delta L = L_t i - Li$
$\Delta C = C1 - C2$
$= \sqrt{(a_t i^2 + b_t i^2)} - \sqrt{(ai^2 + bi^2)}$
$G = (L_t i^2 + a_t i^2 + b_t i^2)$
$\Delta H = \sqrt{(G - \Delta L^2 - \Delta C^2)}$
$W_i$ is the weight value for the patch i The respective functions of the color processing apparatus 12 may be incorporated in driver software, and the above-described processing may be implemented on a computer incorporating the driver software.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-250065, filed Sep. 26, 2007, which is hereby incorporated by reference herein in its entirety.

What is claimed is:

1. A color processing apparatus comprising:
an inputting section, arranged to input color data of a plurality of patches included in a color chart captured by an image sensing device;
a display controller, arranged to display on a monitor a first user interface for displaying patch images based on the color data, and an evaluation value and a default weight value of each of the patch images, and to display on the monitor a second user in interface for a user inputting a first value and second value as a user designation of a range of the evaluation value and a corrective weight value for a patch image having an evaluation value which falls within that range, wherein a user's instruction to adjust a weight value for each of the patch images can be inputted by either changing the default weight value in the first user interface or inputting the range and the corrective weight value in the second user interface; and
a generator, arranged to calculate the evaluation value of the color data of each patch based on a difference between the color data and a target color data corresponding to the patch, and to generate a color processing condition of an image captured by the image sensing device, based on the weight value, the color data, and the target value of a color representation corresponding to each of the patch images.

2. The apparatus according to claim 1, wherein when the user's instruction is inputted, the generator adjusts the weight value of each patch in accordance with the user's instruction, and recalculates the evaluation value of each patch, and the display controller displays the recalculated evaluation value and the adjusted weight value on the first user interface.

3. The apparatus according to claim 1, wherein the evaluation value represents a color difference between the color of the patch image and a color represented by the target color data.

4. The apparatus according to claim 1, further comprising a setting section arranged to detect from the patch images a patch image whose variance of luminance values is not less than a predetermined value and set an initial value of the weight value for the detected patch image to 0.

5. The apparatus according to claim 1, wherein the generator generates the color processing condition that minimizes a sum of the evaluation values of the patch images.

6. The apparatus according to claim 1, further comprising a transmitter arranged to transmit the color processing condition to the image sensing device.

7. A color processing method comprising the steps of:
inputting color data of a plurality of patches included in a color chart captured by an image sensing device;
calculating an evaluation value of the color data of each patch based on a difference between the color data and a target color data corresponding to the patch;
displaying on a monitor a first user interface to display patch images based on the color data, and the evaluation value and a default weight value of each of the patch images;
displaying on the monitor a second user interface for a user to input a first value and second value as a user designation o f a range of the evaluation value and a corrective weight value for a patch image having an evauation value which falls within that range, wherein a user's instruction to adjust a weight value for each of the patch images can be inputted by either changing the default weight value in the first user interface or inputting the range and the corrective weight value in the second user interface; and
generating a color processing condition of an image captured by the image sensing device, based on the weight value, the color data and the target value of a color epresentation corresponding to each of the patch images.

8. A non-transitory computer-readable medium storing a computer-executable program for causing a computer to perform a color prosessing method, the method comprising the steps of:
inputting color data of a plurality of patches included in a color chart captured by an image sensing device;
calculating an evaluation value of the color data of each patch based on a difference between the color data and a target color data corresponding to the patch;
displaying on a monitor a first user interface to display patch images based on the color data, and the evaluation value and a default weight value of each of the patch images;
displaying on the monitor a second user interface for a user to input a first value and second value as a user designation of a range of the evaluation value and a corrective weight value for a patch image having an evaluation value which falls within that range, wherein a user's instruction to adjust a weight value for each of the patch images can be inputted by either changing the default weight value in the first user interface or inputting the range and the corrective weight value in the second user interface; and
generating a color processing condition of an image captured by the image sensing device, based on the weight value, the color data, and the target value of a color representation corresponding to each of the patch images.

* * * * *